United States Patent
Wellbrock et al.

(10) Patent No.: US 8,855,494 B2
(45) Date of Patent: Oct. 7, 2014

(54) MULTI-BAND RECONFIGURABLE OPTICAL ADD-DROP MULTIPLEXER (ROADM) SYSTEM

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 76 days.

(21) Appl. No.: 13/556,281

(22) Filed: Jul. 24, 2012

(65) Prior Publication Data
US 2014/0029948 A1    Jan. 30, 2014

(51) Int. Cl.
*H04J 14/02* (2006.01)
*H04J 14/08* (2006.01)
*H04B 10/00* (2013.01)

(52) U.S. Cl.
USPC ............... 398/83; 398/79; 398/92; 398/101; 398/160

(58) Field of Classification Search
CPC . H04J 14/0204; H04J 14/0205; H04J 14/021; H04J 14/0213; H04B 10/2537; H04B 10/2912; H04B 10/2914; H04B 10/2916; H04B 2210/003
USPC .............. 398/79, 83, 92, 101, 160
See application file for complete search history.

(56) References Cited

U.S. PATENT DOCUMENTS

| | | | | |
|---|---|---|---|---|
| 6,310,716 | B1 * | 10/2001 | Evans et al. | 359/334 |
| 6,549,315 | B1 * | 4/2003 | Kakui | 398/160 |
| 6,785,042 | B1 * | 8/2004 | Onaka et al. | 359/334 |
| 7,346,280 | B1 * | 3/2008 | Sguazzotti et al. | 398/92 |
| 2002/0051267 | A1 * | 5/2002 | Nakamura et al. | 359/134 |
| 2003/0063373 | A1 * | 4/2003 | Emori et al. | 359/341.3 |
| 2003/0215241 | A1 * | 11/2003 | Hwang et al. | 398/92 |
| 2004/0184816 | A1 * | 9/2004 | Charlet | 398/152 |
| 2004/0233518 | A1 * | 11/2004 | Song et al. | 359/349 |
| 2008/0158657 | A1 * | 7/2008 | Muro et al. | 359/334 |
| 2009/0022489 | A1 * | 1/2009 | Way | 398/4 |
| 2009/0174932 | A1 * | 7/2009 | Chang et al. | 359/345 |
| 2010/0021159 | A1 * | 1/2010 | Chiu et al. | 398/43 |
| 2010/0129081 | A1 * | 5/2010 | Onaka | 398/81 |
| 2010/0329686 | A1 * | 12/2010 | Frankel | 398/83 |
| 2011/0188855 | A1 * | 8/2011 | Kokubun et al. | 398/43 |
| 2011/0206204 | A1 * | 8/2011 | Sychev | 380/256 |
| 2013/0236175 | A1 * | 9/2013 | Sethumadhavan et al. | 398/55 |
| 2013/0279908 | A1 * | 10/2013 | Jenkins et al. | 398/48 |

* cited by examiner

*Primary Examiner* — David Payne
*Assistant Examiner* — Pranesh Barua

(57) ABSTRACT

A device includes a first band coupler, a first reconfigurable optical add-drop multiplexer (ROADM), a second ROADM, and a second band coupler. The first band coupler is configured to decouple a regular band and an extended band. The first ROADM is configured to add or drop one or more frequencies in the decoupled regular band to produce a first output in the regular band. The second ROADM is configured to add or drop one or more frequencies in the decoupled extended band to produce a second output in the extended band. The second band coupler is configured to couple the first output and the second output to produce a third output occupying the regular band and the extended band.

23 Claims, 12 Drawing Sheets

MULTI-BAND RECONFIGURABLE OPTICAL ADD-DROP MULTIPLEXER (ROADM) SYSTEM

BACKGROUND INFORMATION

With the growing demand for network bandwidths, the amount of network traffic will soon test the limits of existing optical fiber network systems. To further increase the capacity of networks, communication technology companies and research institutions are developing optical fibers that can support greater network bandwidths.

DETAILED DESCRIPTION OF PREFERRED EMBODIMENTS

The following detailed description refers to the accompanying drawings. The same reference numbers in different drawings may identify the same or similar elements.

As described below, a multi-band reconfigurable add-drop multiplexer (ROADM) system uses multiple communication bands: a regular band and extended bands. For example, in one embodiment, a two-band ROADM system uses both the C-band (wavelengths between 1530 nanometers (nm)-1560 nm) as well as the L-band (wavelengths between 1565 nm-1625 nm). For a given network, in a two-band ROADM system, two ROADMS are used in place of each ROADM that would be installed in the network to build a single-band ROADM system. More generally, in a multi-band ROADM system, multiple ROADMS are used in place of each ROADM that would be installed in the network to build a single-band ROADM system.

Figure 1:
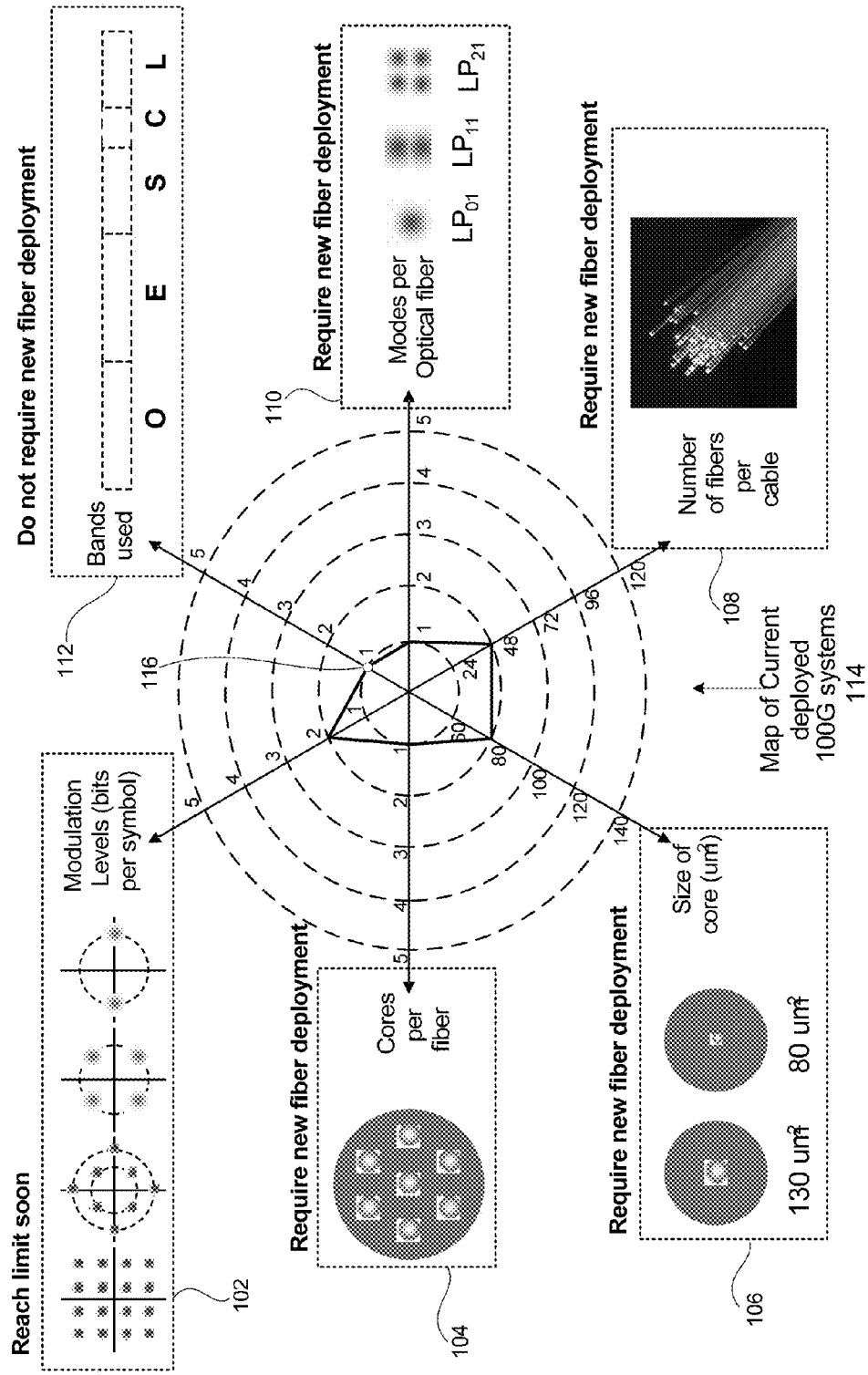
FIG. 1 illustrates different approaches for increasing network bandwidths.

FIG. 1 illustrates a number of different technological approaches for increasing network bandwidths. As shown, optical network bandwidths may be increased by increasing modulation levels 102, the number of cores per optical fiber 104, the size of core 106, the number of cables per fiber 108, the number of modes per optical fiber 110, and the number of bands per optical fiber 112.

Modulation level 102 refers to the number of bits encoded based on phases states of a given modulation method. Different modulation methods include: Differential Phase Shift Keying (DPSK) (modulation level 1-1 bit encoded by each phase state); Differential Quadrature Phase Shift Keying (DQPSK) (modulation level 2-2 bits encoded by each phase state); Dual Polarization State Quadrature Phase Shift Keying Modulation (modulation level 4-4 bits encoded by each phase state), etc.

For a physical optical network, capacity varies linearly with the number of cores per fiber 104, optical fibers per cable 108 and modes per optical fiber 110. Therefore, increasing the number of cores per fiber 104, optical fibers per cable 108, and modes per optical fiber 110 increases the capacity directly in proportion to the number of cores, optical fibers, and modes. Increasing the size of a core 106 may reduce nonlinear penalty, which, in turn, allows higher levels of modulation and increased optical power.

Network capacity may also be affected by the number of bands 112 that are used for communication in a single-core optical fiber. Currently, in many systems, only one communication band is used. If additional bands (herein referred to as "extended bands") were used in addition to the original band (herein referred to as "regular band"), the network bandwidth would increase by the amount associated with the extended bands.

For current 100 gigabits per second (referred to as 100 G) systems, FIG. 1 shows a map 114 of currently deployed technologies. More specifically, map 114 is a graphical plot of modulation level 102, cores per fiber 104, size of core 106, number of optical fibers per cable 108, number of modes per optical fiber 110, and number of bands 112. Map 114 shows the modulation level 102 to be at 2, the number of cores per optical fiber 104 at 1, the size of core 106 at 130 or 80 microns ($\mu$m), the number of optical fibers 108 at 48, the number of modes 110 at 1, and the number of bands 112 at 1.

As also indicated in FIG. 1, attempts to further increase network capacity by changing the modulation level 102 may soon hit a technological limit. Furthermore, increasing the network capacity by increasing the number of cores per fiber 104, the size of each core 106, the number of optical fibers per cable 108, and the number of modes per optical fiber 110 requires deployment of new optical fibers, which is costly. This leaves increasing the number of bands 112 per optical fiber as an attractive low cost-to-benefit approach for increasing the network capacity/bandwidth. To convert a system that uses a single optical communication band into one that uses two or more extended communication bands, new ROADMS may be installed in the system. In addition, Raman pumps may be installed in the system as necessary to amplify the signals in the extended bands.

Figure 2:
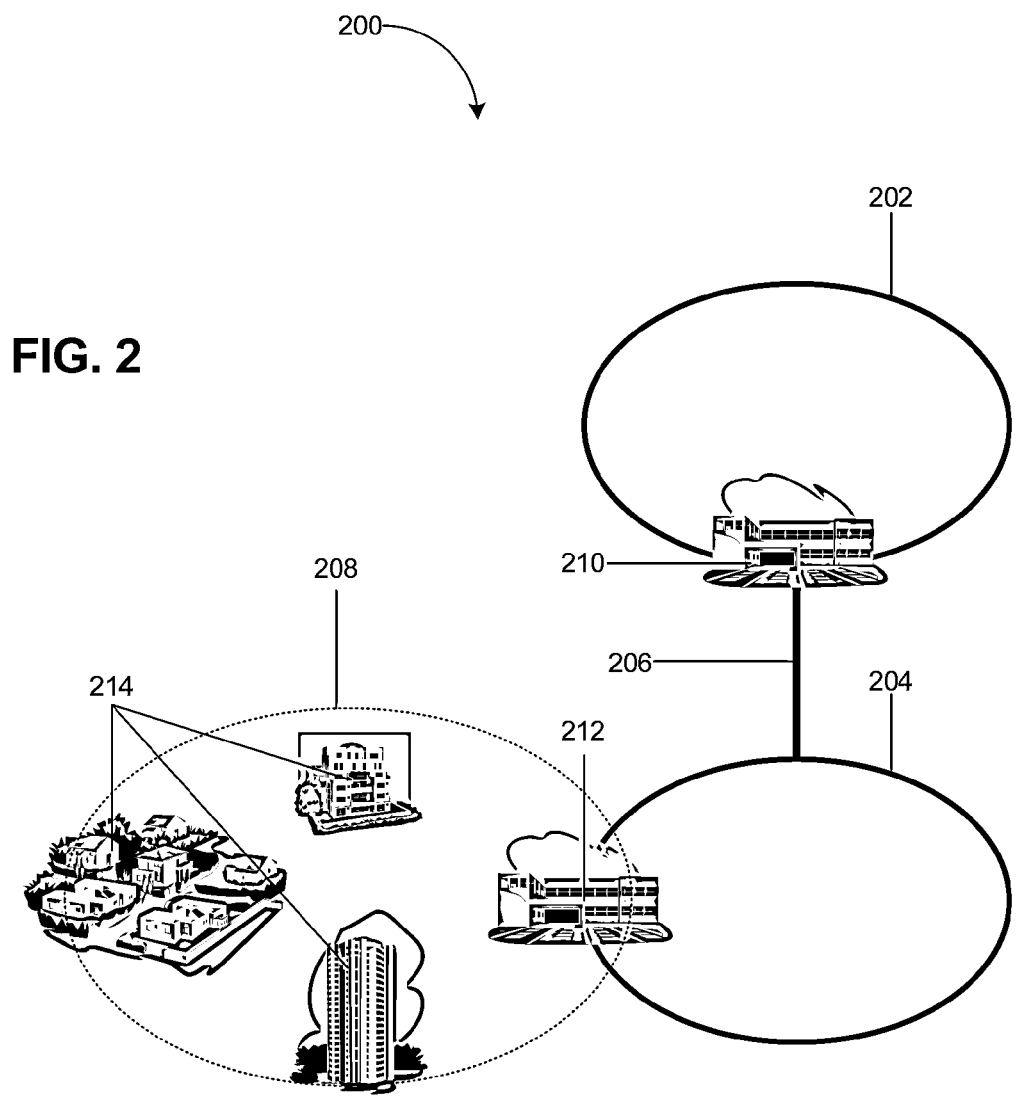
FIG. 2 illustrates an exemplary optical network in which concepts described herein may be implemented.

FIG. 2 shows an exemplary optical network 200 in which the concepts described herein may be implemented. As shown, optical network 200 may include metro/regional networks 202 and 204, long haul or ultra-long haul optical lines 206, and edge network 208. Depending on the implementation, optical network 200 may include additional, fewer, or different optical networks and optical lines than those illustrated in FIG. 2. For example, in one implementation, optical network 200 may include additional edge networks and/or metro/regional networks that are interconnected by Synchronous Optical Network (SONET) rings.

Metro/regional network 202 may include optical fibers and central office hubs that are interconnected by the optical fibers. The central office hubs, one of which is illustrated as central office hub 210, may include sites that house telecommunication equipment, including switches, optical line terminals, ROADMS, etc. In addition to being connected to other central offices, central office hub 210 may provide telecommunication services to subscribers, such as telephone service, access to the Internet, cable television programs, etc., via optical line terminals.

Metro/regional network 204 may include similar components as metro/regional network 202 and may operate similarly. In FIG. 2, metro/regional network 204 is illustrated as including central office hub 212, which may include similar components as central office hub 210 and may operate similarly.

Long haul optical lines 206 may include optical fibers that extend from metro/regional optical network 202 to metro/regional optical network 204. Edge network 208 may include optical networks that provide user access to metro/regional optical network 204. As shown in FIG. 2, edge network 208 may include access points 214 (e.g., office buildings, residential area, etc.) via which end customers may obtain communication services from central office hub 212.

Figure 3:
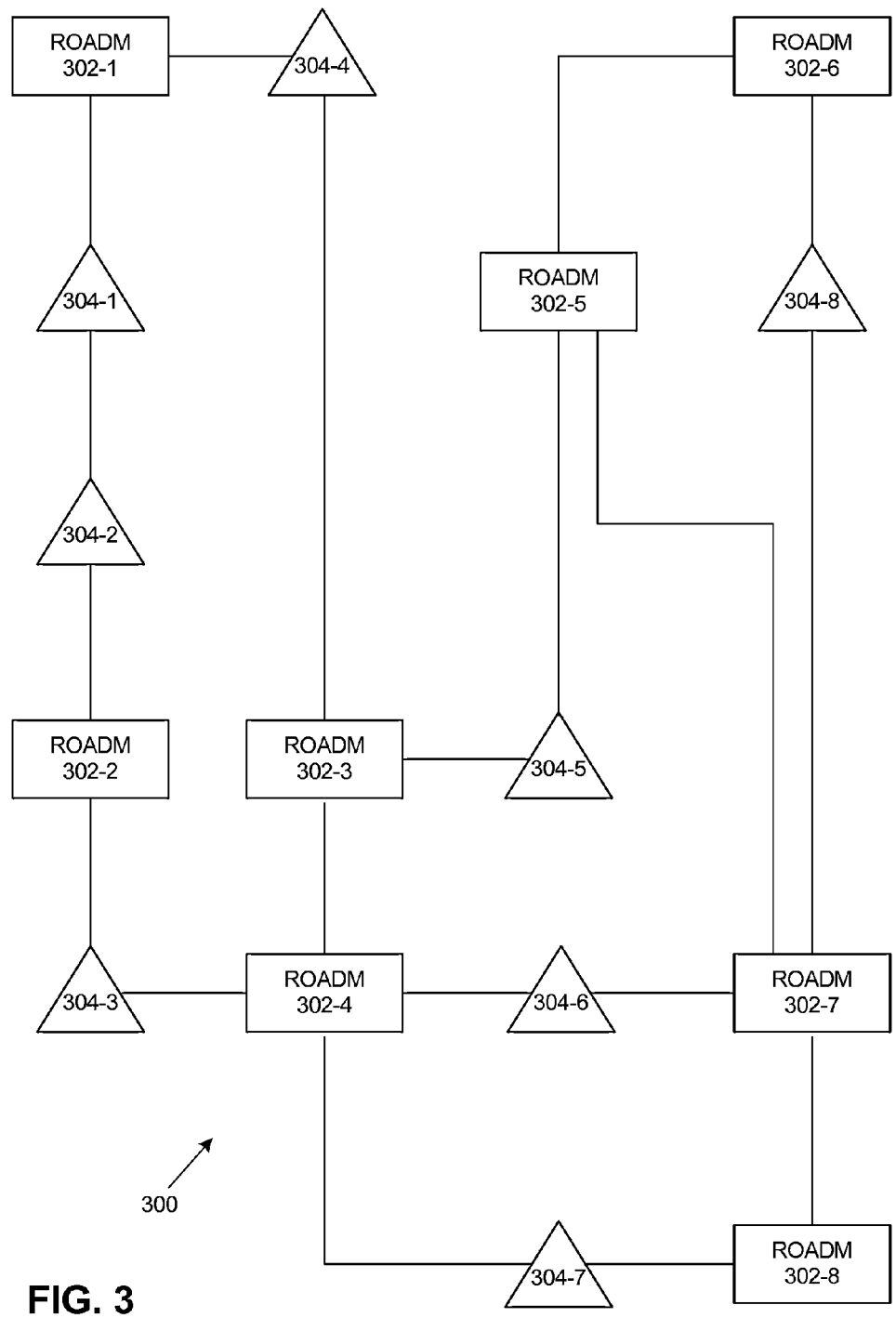
FIG. 3 is a diagram of an exemplary portion of the optical network of FIG. 2 according to an implementation based on a single communication band.

FIG. 3 is a diagram of an exemplary portion 300 of optical network 200 according to an implementation based on a single communication band. Network portion 300 may be part of metro/regional network 202/204 or long haul optical lines 206. As shown, portion 300 may include ROADMS 302-1 through ROADMS 302-8 (collectively "ROADMS 302" and individually "ROADM 302"), optical amplifiers 304-1 through 304-8 (collectively "optical amplifiers 304" and individually "optical amplifier 304"), and optical fibers that connect ROADMS 302 and optical amplifiers 304.

ROADM 302 may select and/or inject one or more frequencies of light from/into a beam whose frequencies span a regular band. ROADM 302 may include wavelength selective switches to separate light into different frequencies and to select individual frequencies. Wavelength selective switches may be constructed from liquid crystal (LC), micro mirrors (micro-electromechanical system (MEMS) type), and liquid crystal on silicon (LCOS).

In some implementations, ROADM 302 may also include amplifiers and a channel monitor for detecting errors. In addition, in some implementations, ROADM 302 may be colorless (tunable wavelength switching), directionless (add/drop wavelength can be routed to any direction), and contentionless (each add/drop structure in ROADM 302 can have multiple transponders with at the same wavelength). ROADM 302 may typically be installed at certain locations in long haul optical line 206 and in metro/regional network 204, such as, for example, central office 212 and access points 214.

Optical amplifier 304 may include, for example, a doped-fiber amplifier, semiconductor amplifier, Raman amplifier, etc. Given an input signal, optical amplifier 304 may generate a corresponding output signal with a gain (i.e., the output signal has more power than the input signal).

In FIG. 3, the number of components and the specific interconnections are exemplary. In a different implementation, network portion 300 may include additional, fewer, or a different arrangement of components than those illustrated in FIG. 3. Furthermore, although not illustrated in FIG. 3 for simplicity, network portion 300 may include components other than those illustrated in FIG. 3 (e.g., regenerators).

Figure 4:
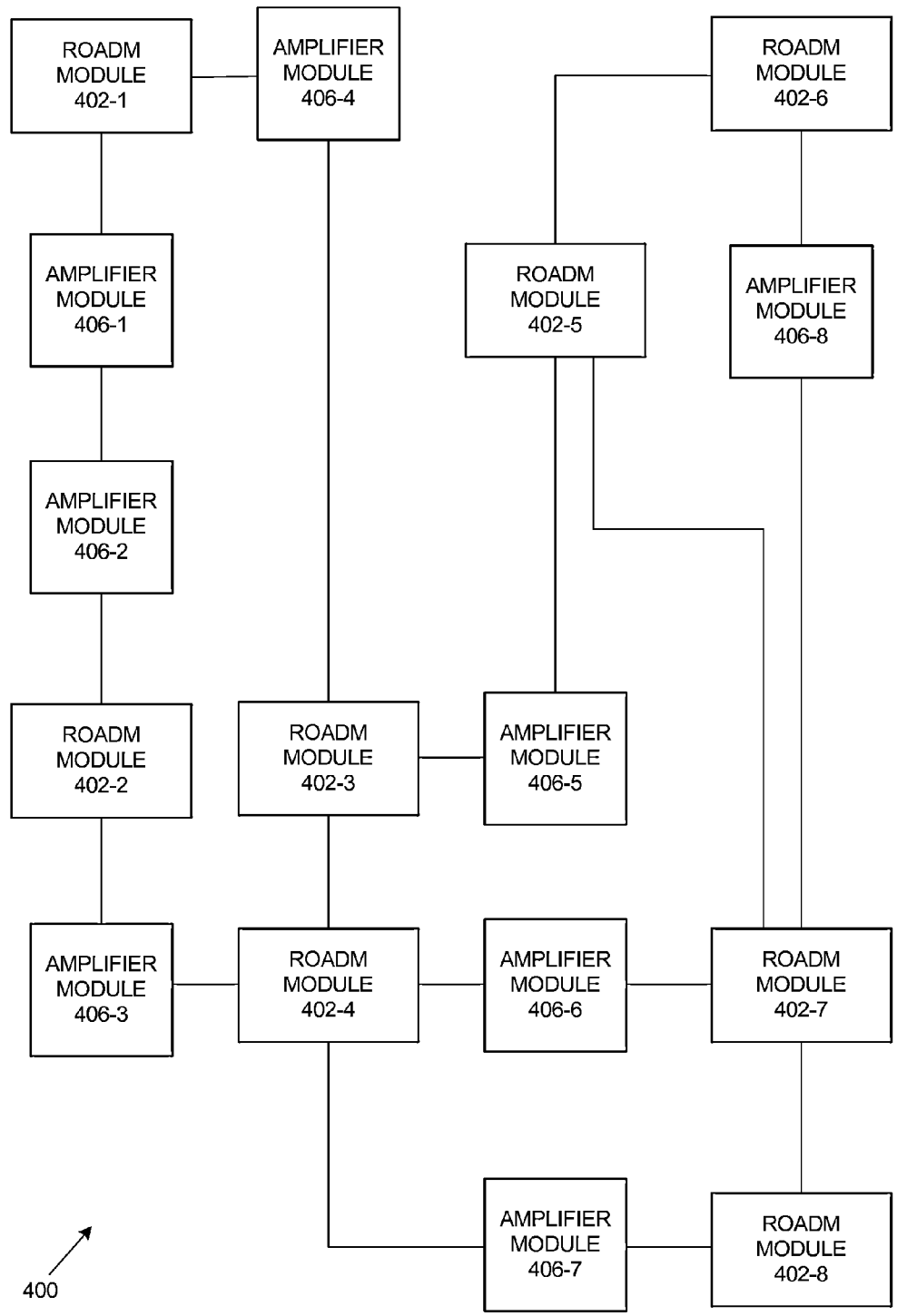
FIG. 4 is a diagram of the exemplary portion of the optical network of FIG. 2 according to an implementation based on two or more communication bands.

FIG. 4 is a diagram of an exemplary portion 400 of optical network of 200 according to an implementation based on two or more communication bands. As shown, network portion 400 may include ROADM modules 402-1 through 402-8 (collectively "ROADM modules 402" and individually "ROADM module 402"), amplifier modules 406-1 through 406-8 (collectively "amplifier modules 406" and individually "amplifier module 406"), and optical fibers that connect ROADM modules 402 and amplifier modules 406. The implementation of FIG. 4 may be obtained by replacing each of ROADMS 302 and optical amplifiers 304 in network portion 300 with a ROADM module 402 and an amplifier module 406. In other implementations, however, network portion 400 may include additional, fewer, or different components than those illustrated in FIG. 4.

ROADM module 402 may select and/or inject one or more frequencies of light from/into a beam whose frequencies span two or more communication bands: the regular band and extended bands. As described below, ROADM module 402 may include a ROADM 302, one or more additional ROADMS, as well as other components.

Amplifier module 406 may include optical amplifier 304 for providing gain to the optical signal in the regular band and/or a pump (e.g., Raman pump) for providing the energy for amplification of the optical signals in the extended band(s).

Figure 5:
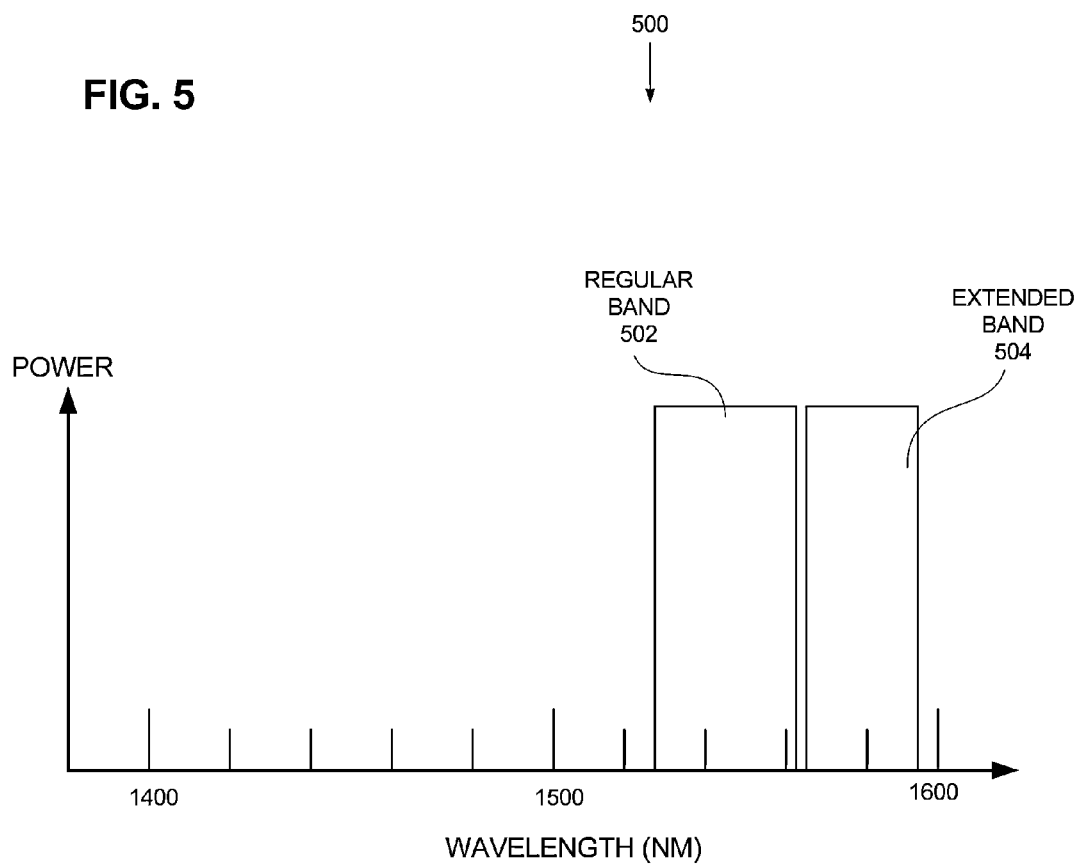
FIG. 5 illustrates a regular band and an extended band for the network of FIG. 4.

FIG. 5 illustrates a regular band 502 and an extended band 504 for network 400. In one implementation, regular band 502 corresponds to the C-band and extended band 504 corresponds to the L-band. As indicated above, regular band 502 is used in both network portion 300 and network portion 400. Extended band 504 is used in network portion 400 but not in network portion 300. The combination of regular band 502 and extended band 504 of network portion 400 accommodates additional communication channels, and accordingly, network portion 400 supports greater network traffic than network portion 300 (e.g., approximately twice the capacity of network portion 300). Although not illustrated, in some implementations, network portion 400 may use additional extended bands.

Figure 6A:
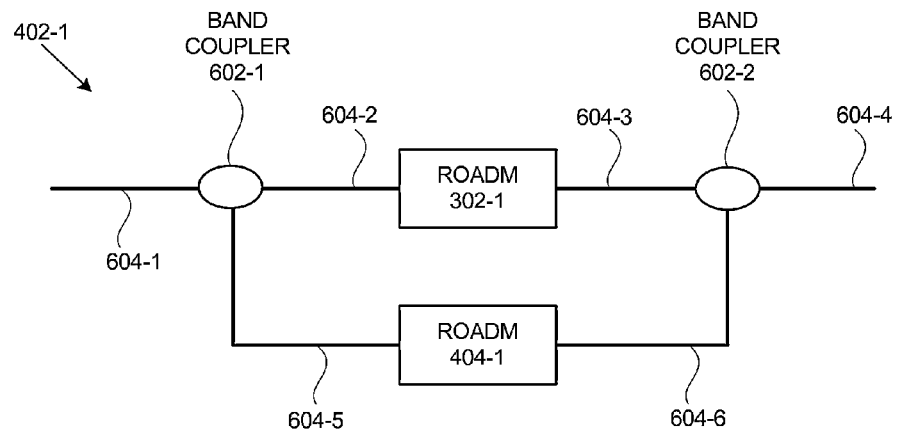
FIG. 6A is a diagram of exemplary components of an exemplary reconfigurable optical add-drop multiplexer (ROADM) module of FIG. 4 according to one implementation.

FIG. 6A is a diagram of exemplary components of a ROADM module 402-1 according to one implementation. Each of other ROADM modules 402 in FIG. 4 may include similar components and may be configured similarly as ROADM module 402-1.

In FIG. 6A, ROADM module 402-1 is implemented as a dual ROADM module. As shown, ROADM module 402-1 may include a ROADM 302-1, a ROADM 404-1, a band coupler 602-1, a band coupler 602-2, and optical path/fiber segments 604-1 through 604-6 (collectively "optical paths/fiber segments 604" and individually "optical path/fiber segment 604"). Depending on the implementation, ROADM module 402-1 may include additional, fewer, different, or a different arrangement of components than those illustrated in FIG. 6A.

Band coupler 602-1 may combine input signals in regular band 502 and in extended band 504 or segregate signals in the two communication bands 502 and 504, depending on the direction of the input and output signals. Assume that input signals are provided via optical paths 604-2 and 604-5 and band coupler 602-1 sends output signals on optical path 604-1. In this case, band coupler 602-1 combines signals in regular band 502, from optical path 604-2, and signals of extended band 504, from optical path 604-5, and outputs the aggregated signals of two bands 502 and 504 on optical path 604-1.

Conversely, assume that input optical signals of two bands are provided to band coupler 602-1 via optical path 604-1. In this case, band coupler 602-1 segregates the input signals into signals that belong to regular band 502 and signals that belong to extended band 504. Band coupler 602-1 outputs the signals of each band to optical paths 604-2 and 604-5, respectively.

Band coupler 602-2 may operate similarly as band coupler 602-1, but with respect to optical paths 604-3, 604-4, and 604-6. That is, band coupler 602-2 may combine optical signals from optical paths 604-3 and 604-5 and output the combined signals on optical path 604-4. Band coupler 602-2 may also segregate optical signals from optical path 604-4 into signals in regular band 502 and signals in extended band 504, and output the segregated signals on optical paths 604-3 and 604-6, respectively.

ROADM 302-1 adds/drops optical signals, which belong to regular band 502, on/from optical paths 604-2 and 604-3. Similarly, ROADM 402-1 adds/drops optical signals, which belong to extended band 504, on/from optical paths 604-5 and 604-6.

Optical paths 604 carry optical signals from one optical component/element to another.

Figure 6B:
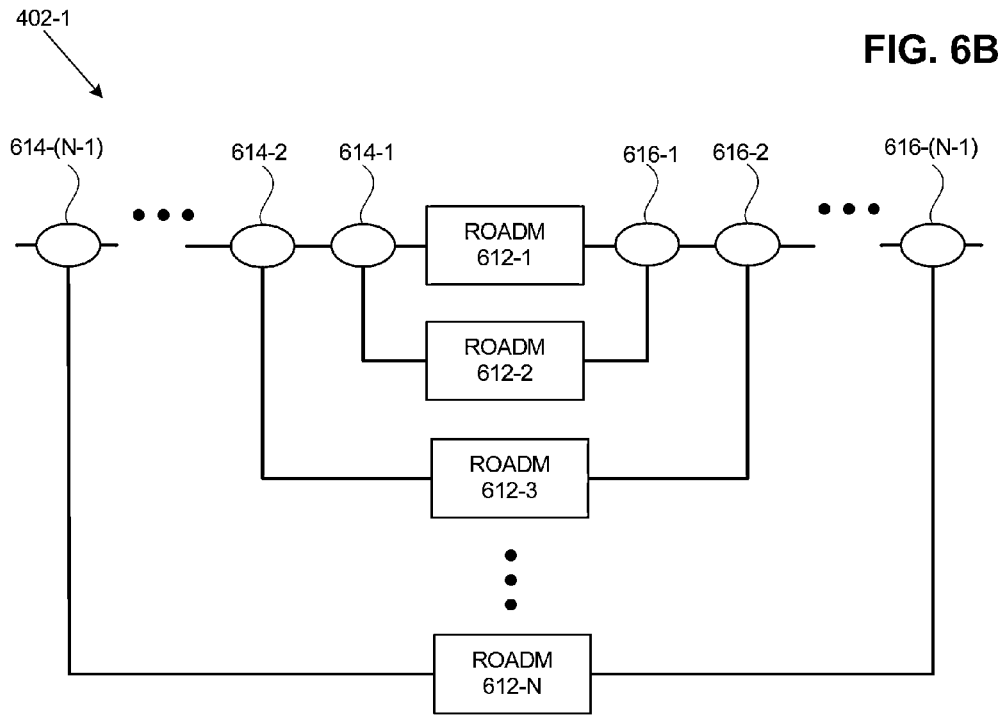
FIG. 6B is a diagram of exemplary components of the ROADM module of FIG. 4 according to another implementation.

FIG. 6B is a diagram of exemplary components of ROADM module 402-1 according to another implementation. In this implementation, network portion 400 uses regular band 502 and N−1 extended bands (e.g., extended band 1, extended band 2, ... extended band N−1, where N is an integer greater than 2). As shown, ROADM module 402-1 includes ROADMS 612-1 through 612-N (collectively "ROADMS 612" and individually "ROADM 612"), band couplers 614-1 through 614-(N−1) (collectively "band couplers 614" and individually "band coupler 614"), and band couplers 616-1 through 616-(N−1) (collectively "band couplers 616" and individually "band coupler 616"). For simplicity, optical paths in FIG. 6B are not labeled. The optical paths in FIG. 6B carry optical signals from one optical component to another.

Band coupler 614-1 may combine input signals in regular band 502 and in one of N−1 extended bands or segregate signals in the two communication bands, depending on the direction of the input and output signals. Other band couplers 614 may operate similarly.

Each of band couplers 616 may operate similarly as a corresponding band coupler 614, but with respect to different optical paths.

ROADM 612-1 adds/drops optical signals, which belong to regular band 502, on/from optical paths. Similarly, each of other ROADMS 612 adds/drops optical signals, which belong to one of extended bands 1 through N−1, on/from optical paths.

Figure 7:
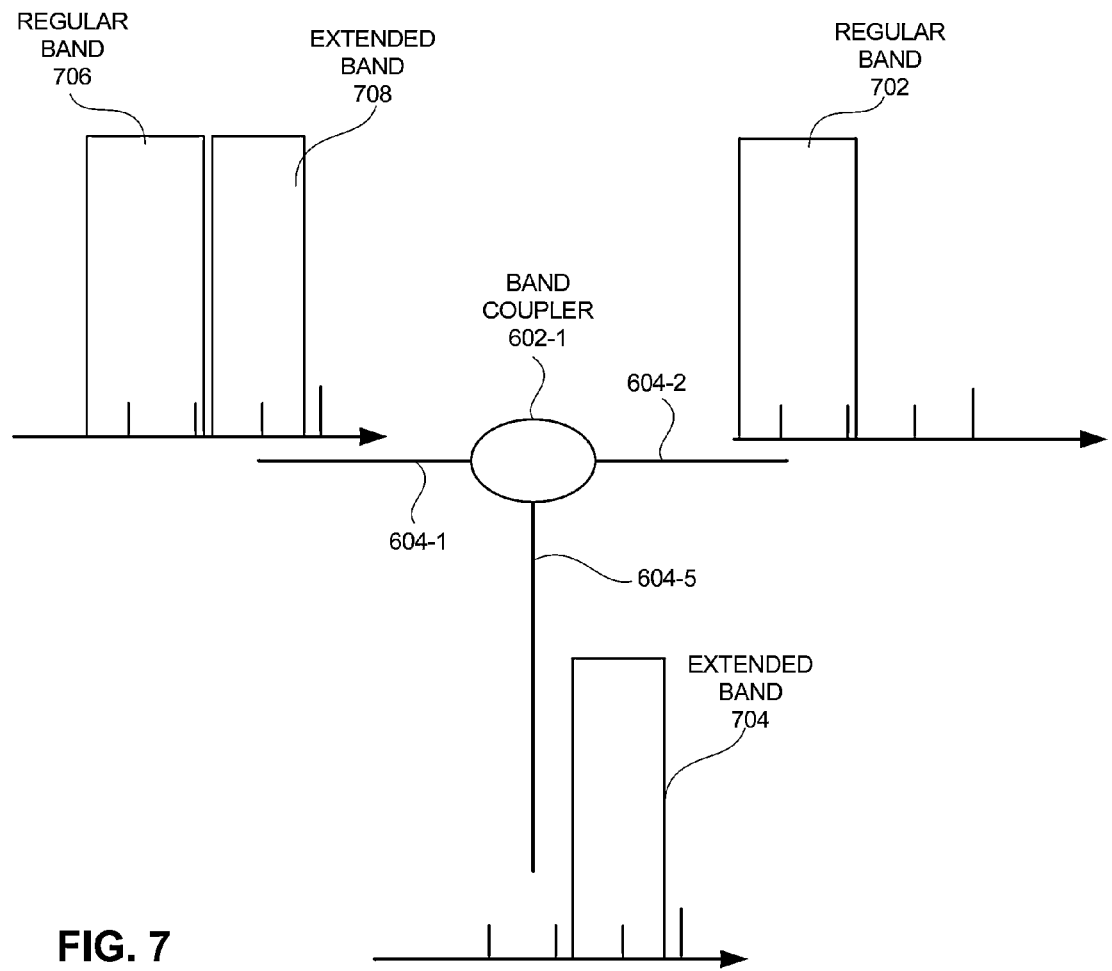
FIG. 7 illustrates an exemplary operation of an exemplary band coupler of FIG. 6A.

FIG. 7 illustrates an exemplary operation of band coupler 602-1. As indicated above, band coupler 602-2 (or other band couplers (e.g., band couplers 614) in a network of ROADM modules 402) may operate similarly band coupler 602-1.

Assuming that optical signals are propagating from the right to left, optical path 604-2 carries optical signals in regular band 702, and optical path 604-5 carries optical signals in extended band 704. Band coupler 602-1 combines the signals and outputs the combined signals on optical path 604-1, in regular band 706 and extended band 708.

For optical signals travelling from the left to right, optical path 604-1 carries optical signals in regular band 706 and extended band 708. Band coupler 602-1 segregates the signals into signals that belong to regular band 702 and signals that belong to extended band 704. Band coupler 602-1 outputs the signals that belong to regular band 702 on optical path 604-2 and outputs the signals that belong to extended band 704 on optical path 604-5.

Band coupler 602-1 has the property that it injects only a minimal insertion loss in signals traveling on optical paths 604-1 to 604-2 (or vice versa), to reduce the impact on signals in regular band 702 (e.g., insertion loss is less than a particular threshold). Band coupler 602-2 (or other band couplers) has a similar property.

Figure 8:
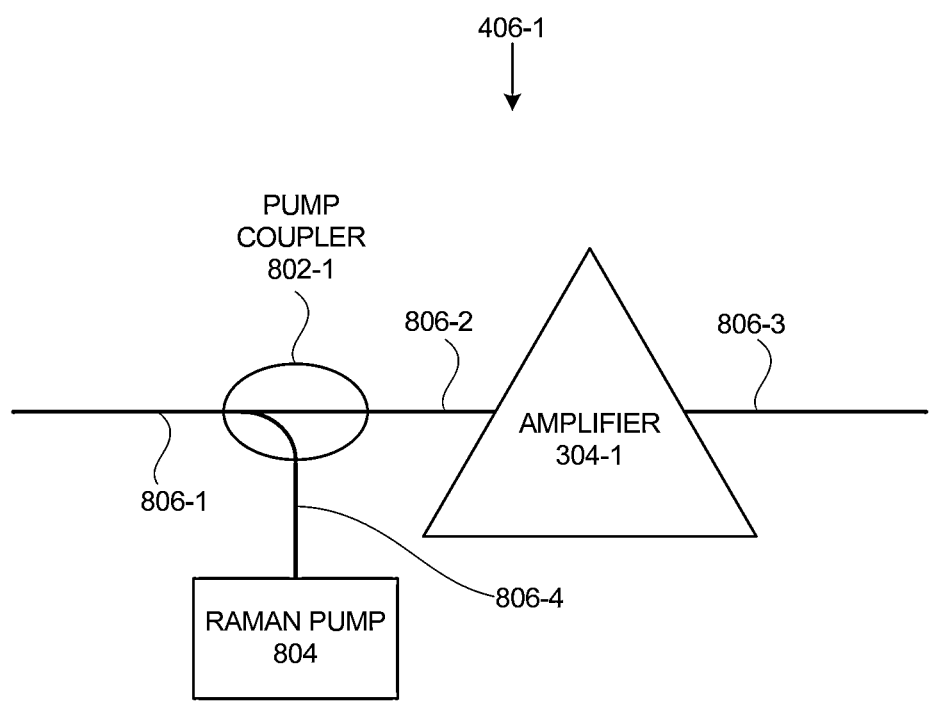
FIG. 8 is a diagram of exemplary components of an amplifier module of FIG. 4 according to one implementation.

FIG. 8 is a diagram of exemplary components of amplifier module 406-1 according to one implementation. In this implementation, amplifier module 406-1 amplifies optical signals that travel from the left to right (from optical path 806-1 to optical path 806-3). As shown, amplifier module 406-1 may include amplifier 304-1, pump coupler 802-1, Raman pump 804, and optical paths/fiber segments 806-1 through 806-4 (collectively "optical paths/fiber segments 806" and individually "optical path/fiber segment 806").

Pump coupler 802 receives optical signals via optical path 806-1 and pump signals from Raman pump 804 via optical path 806-4, combines the signals, and outputs the combined signals on optical path 806-2.

Raman pump 804 generates Raman signals and outputs the Raman signals on optical path 806-4. Amplifier 304-1 receives optical signals in the regular band from optical path 806-2, amplifies the signals, and outputs the amplified signals on optical path 806-2. In one implementation, amplifier 304-1 does not amplify the signals in the extended band(s), and simply passes such signals from optical path 806-2 to 806-3.

Optical paths 806 convey optical signals from one optical component/element to another. Optical path 806-1 may include a segment of Raman fiber. The segment of Raman fiber may transfer the energy in the Raman signals from Raman pump 804 to the signals in extended band 504, thus amplifying the signals in extended band 504.

In operation, the power level of Raman pump 804 and the gain of optical amplifier 304-1 may be tuned/adjusted such that the signals in regular band 502 and extended bands are proportionately amplified. Because pump couplers 802 and band couplers 602 introduce insertion loss, the signals in regular band 502 may degrade by an extent greater than the amount anticipated based on fiber loss.

Although FIG. 8 shows amplifier module 406-1 as including Raman pump 804 and amplifier 304-1, depending on the implementation and system properties, amplifier module 406-1 may include additional, fewer, different, or a different arrangement of components than those illustrated in FIG. 8. For example, in one implementation, pump coupler 802-1 may be installed to the right of amplifier 304-1, rather than to the left of amplifier 304-1 as shown in FIG. 8. In another example, amplifier module 406 may include only a Raman amplifier (for amplifying signals of a particular extended band) and a corresponding pump coupler, but may not include amplifier 304-1. In yet another example, amplifier module 406 may include multiple Raman amplifiers and corresponding pump couplers. In still yet another example, amplifier module 406 may include only an optical amplifier 304.

Figure 9:
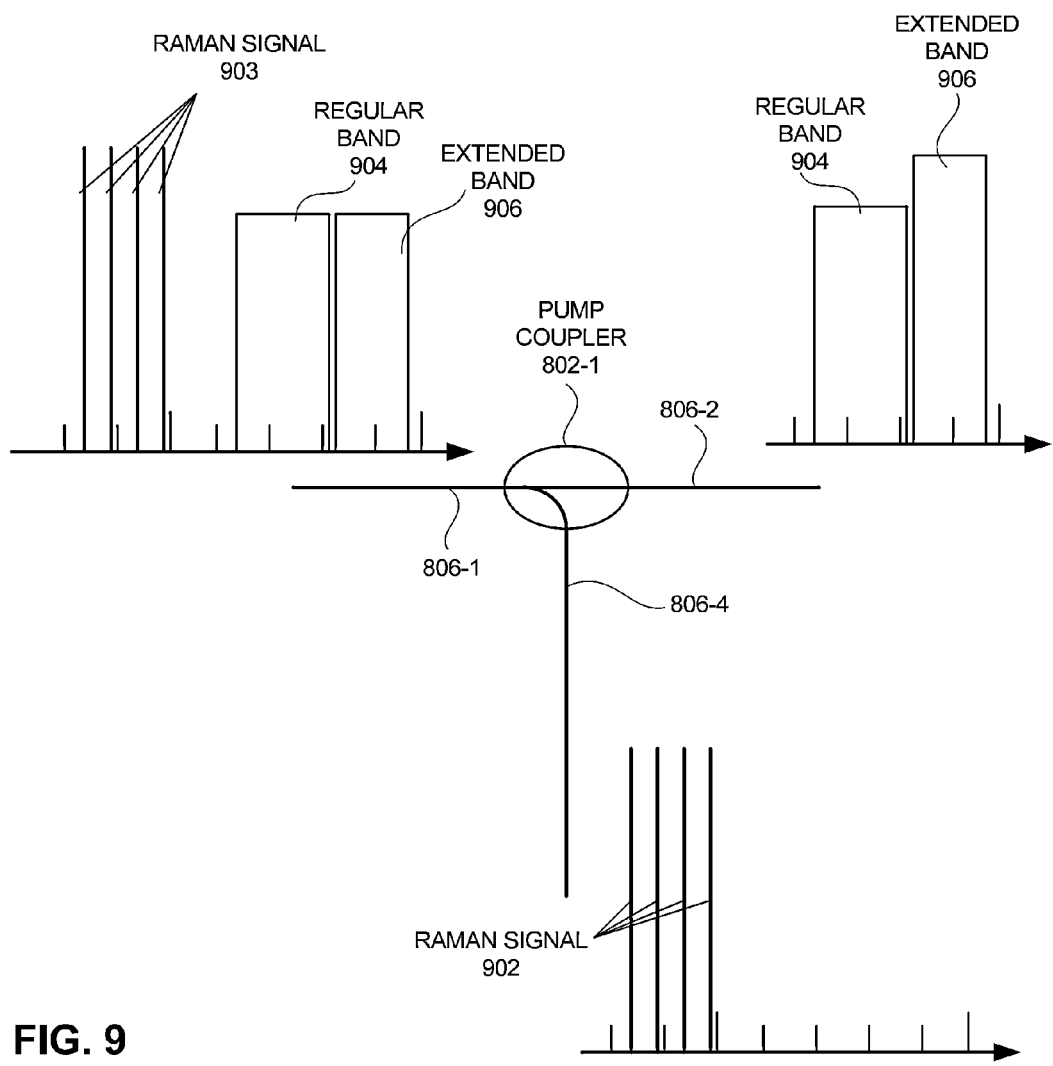
FIG. 9 illustrates an exemplary operation of the exemplary pump coupler of FIG. 8.

FIG. 9 illustrates an exemplary operation of pump coupler 802-1. In FIG. 9, optical signals travel from the left to right (from optical path 806-1 to optical path 806-2), and optical path 806-4 carries Raman signal 902 from Raman pump 804. Raman signal 903 injected in optical path 806-1 propagates from the right to left, in the direction opposite to that of the optical signals in regular band 904 and extended band 906. Raman signal 803 couples with the optical signals in extended band 906 via a Raman fiber in optical path 806-1. Consequently, the signal in regular band 904 experiences no gain, but the signal in extended band 906 experiences a gain. This is illustrated in FIG. 9. On optical path 806-2, the energy in extended band 906 is illustrated as being greater than that in regular band 904.

Pump coupler 802-1 has the property that it only injects a minimal insertion loss in signals traveling on optical paths 806-1 to 806-2-2 (or vice versa), to reduce the impact on signals in regular band 904 (e.g., insertion loss of pump coupler 802-1<a particular threshold). Pump coupler 802-2 (or other pump couplers) has a similar property (e.g., insertion loss of pump coupler 602-2<a particular threshold). Each of other amplifier modules 406 may include similar components and may be configured similarly as amplifier module 406-1.

Although FIG. 9 shows the operation of pump coupler 802-1 for extended band 906 that is adjacent to regular band 904, in other implementations, pump coupler 802-1 may couple Raman signals that amplify signals in another extended band.

Figure 10:
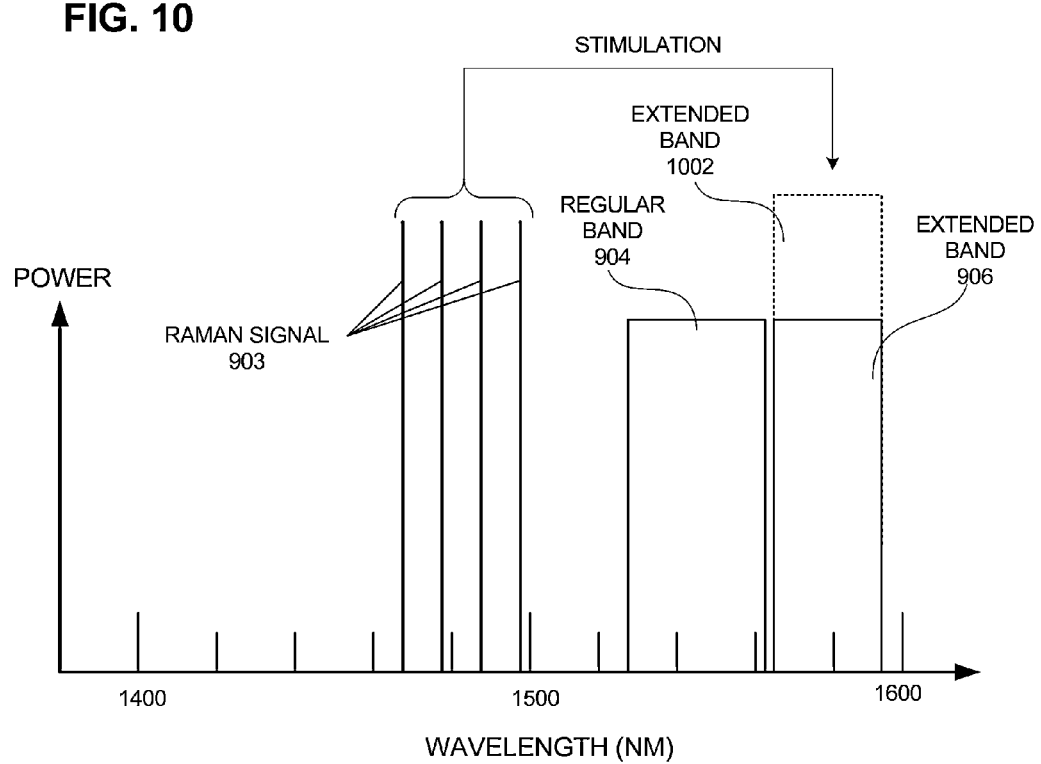
FIG. 10 illustrates exemplary Raman amplification in the amplifier module of FIG. 8.

FIG. 10 illustrates exemplary Raman amplification in amplifier module 406-1. Optical path 806-1 (FIG. 9) may include a Raman fiber. Accordingly, as the optical signals propagate from the left to right and Raman signal 903 travel from the right to left, optical path 906-1 may transfer energy from Raman signal 903 (FIG. 9) to extended band 906. As a consequence of the energy transfer, as shown in FIG. 10, extended band 906 becomes extended band 1002. That is, the optical signals in extended band 906 are amplified. The signals in regular band 904 are not amplified via Raman amplification, but via optical amplifier 304-1.

Figure 11:
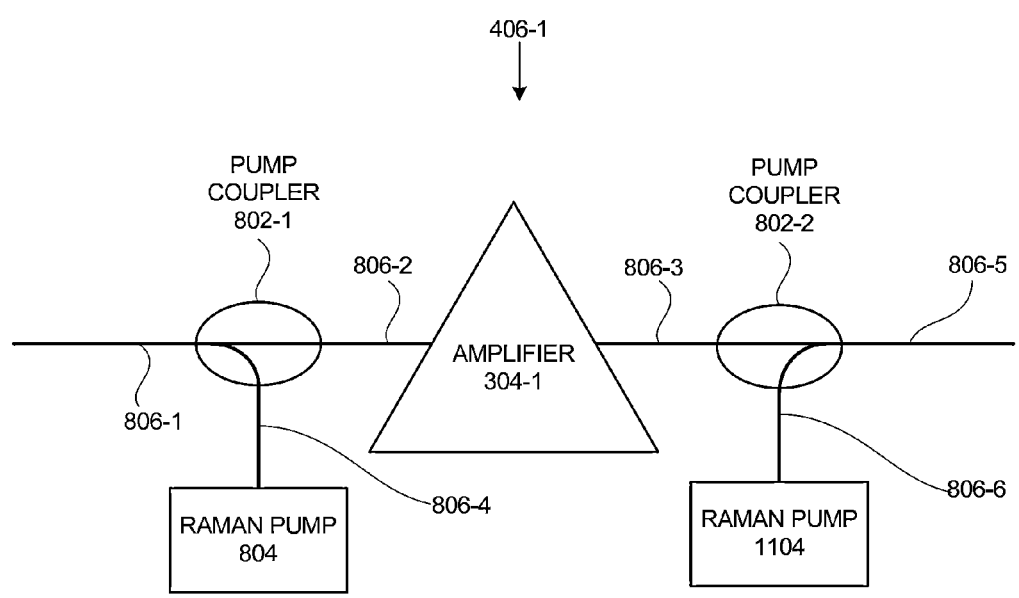
FIG. 11 is a diagram of exemplary components of an amplifier module of FIG. 4 according to another implementation.

FIG. 11 is a diagram of exemplary components of amplifier module 406-1 according to another implementation. In this implementation, amplifier module 406-1 amplifies optical signals that travel from the right to left (signals that travel from optical path 806-5 to optical path 806-1) as well as signals that travel from the left to right (signals that travel from optical path 806-1 to optical path 806-5). As shown in FIG. 11, in addition to the components shown in FIG. 8, amplifier module 406-1 includes pump coupler 802-2, Raman pump 1104, and optical paths 806-5 and 806-6.

In FIG. 11, pump coupler 802-1 couples Raman signals from Raman pump 804 to optical signals traveling from optical path 806-1 to optical path 806-2. Of the coupled signals, those in extended band 906 are Raman amplified via the Raman fiber in optical path 806-1. Among the signals on optical path 806-2, the signals in regular band 904 are then amplified by optical amplifier 304-1. The Raman amplified signals and the signals amplified by optical amplifier 304-1 then pass through pump coupler 802-2 (via optical path 806-3), onto optical path 806-5 without further amplification.

Pump coupler 802-2 couples Raman signals from Raman pump 1104 to optical signals traveling from optical path 806-5 to optical path 806-3. Of the coupled signals, those in extended band 906 are Raman amplified via the Raman fiber on optical path 806-5. Among the signals on optical path 806-3, the signals in regular band 904 are then amplified by optical amplifier 304-1. The Raman amplified signals and the signals amplified by optical amplifier 304-1 then pass through pump coupler 802-1. The amplified signal passes through pump coupler 802-1 (via optical path 806-3), onto optical path 806-1 without further amplification.

Figure 12:
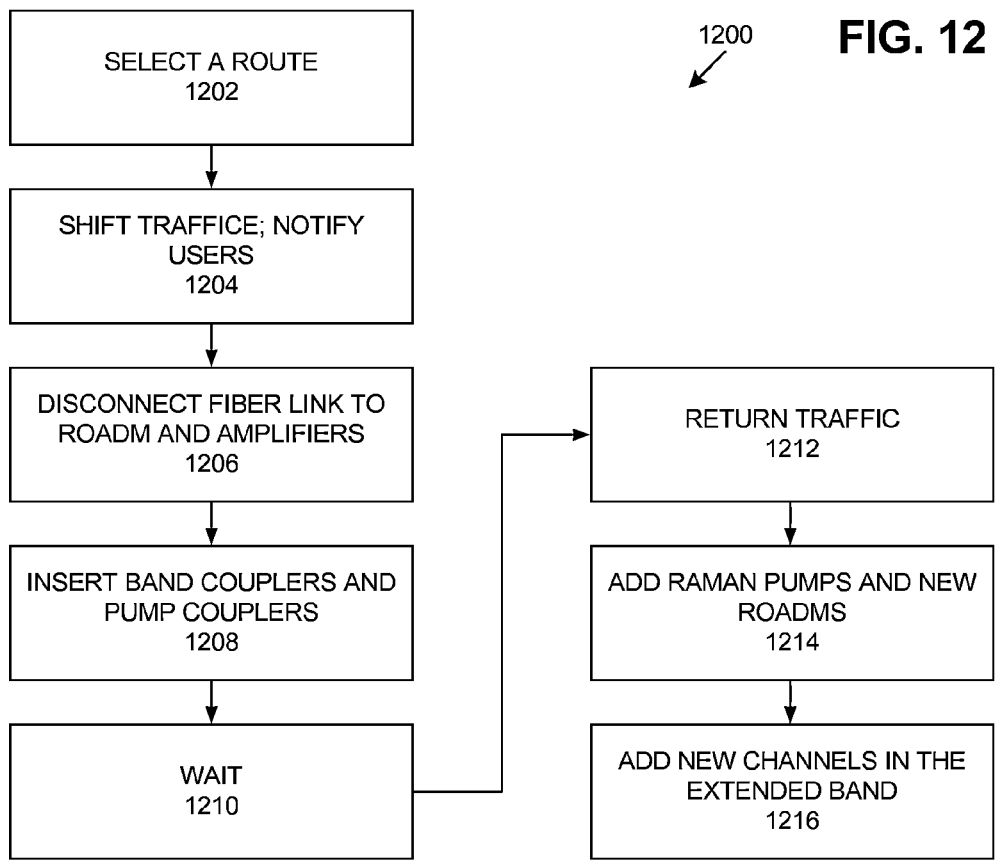
FIG. 12 is a flow diagram of an exemplary process for upgrading an existing ROADM system to enable the system to use an additional communication band.

FIG. 12 is a flow diagram of an exemplary process 1200 for upgrading an existing ROADM system to enable the system to use an additional extended band. Assume that a network engineer or an operator wishes to convert an optical network or a portion of the optical network to so that the optical network uses the extended optical band. As shown, process 1200 may include selecting a route in the network portion (block 1202).

The network operator/engineer may shift important traffic (e.g., packets with high priority) to alternate routes (block 1204). For the un-shifted traffic, the network operator/engineer may notify the users (block 1204) of service interruptions.

The network operator/engineer may disconnect fiber links to existing ROADMS and optical amplifiers in the selected route (block 1206). The network operator/engineer may insert band couplers and pump couplers (block 1208) at certain locations in the route. Inserting the band couplers and pump couplers re-links the existing ROADMS and the optical amplifiers to the selected route.

The locations for the band couplers may be chosen such that when new ROADMS are installed in combination with the band couplers and existing ROADMS, the band couplers, the new ROADMS, and the already installed ROADMS form ROADM modules 402 in the route. Similarly, the locations for the pump couplers may be chosen such that Raman pumps can be installed at various points in the route to provide Raman amplification to optical signals in the extended band(s).

Thereafter, the network operator/engineer may wait for the modified system to recover (block 1210). That is, the network operator may wait for the network traffic to reach an operational state and the interconnected components to be functional. After the waiting period, the network operator/engineer may shift/return the traffic back to the route, from the alternate routes (block 1212).

The network operator/engineer may install new ROADMS (block 1214) in combination with the band couplers to build ROADM modules 402. In addition, the network operator/engineer may also install Raman pumps into the route (block 1214). To use the extended band, the network operator/engineer may add new channels in the extended band (block 1216).

By upgrading an existing ROADM system to a new ROADM system with one or more additional extended bands in accordance with process 1200, performance impact on the existing, working band can be kept relatively small. Because the extended band is powered by Raman pumps, the upgrade has a minimal impact on the existing band.

As described above, a multi-band ROADM) system uses multiple communication bands: a regular band and one or more extended bands. For example, in one embodiment, a two-band ROADM system uses both the C-band as well as the L-band. For a given network, in a two-band ROADM system, two ROADMS are used in place of each ROADM that would be installed in the network to build a single-band ROADM system. More generally, in a multi-band ROADM system, multiple ROADMS are used in place of each ROADM that would be installed in the network to build a single-band ROADM system.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to the process illustrated in FIG. 12, the order of the blocks may be modified in other implementations. In addition, non-dependent blocks may represent blocks that can be performed in parallel.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
a first band coupler to:
  decouple a regular band and an extended band,
a first reconfigurable optical add-drop multiplexer (ROADM) to:
  add or drop one or more frequencies in the decoupled regular band to produce a first output in the regular band;
a second ROADM to:
  add or drop one or more frequencies in the decoupled extended band to produce a second output in the extended band; and
a second band coupler to:
  couple the first output and the second output, without optically amplifying or pumping the first output or the second output, to produce a third output occupying the regular band and the extended band.

2. The system of claim 1, further comprising:
an optical amplifier to:
  receive the third output and amplify frequency components, of the third output, that occupy the regular band, and
  output the amplified frequency components and other frequency components, of the third output, that occupy the extended band as a fourth output.

3. The system of claim 2 further comprising:
a Raman pump; and
a pump coupler for coupling an output from the Raman pump to the fourth output to produce a fifth output.

4. The system of claim 1, further comprising:
a Raman pump, and
a pump coupler for coupling an output from the Raman pump to the third output to produce a fourth output.

5. The system of claim 4, further comprising:
a Raman gain fiber to receive the fourth output and to provide a gain for frequency components, of the fourth output, in the extended band.

6. The system of claim 4, further comprising:
an optical amplifier to:
  receive the fourth output and amplify frequency components, of the fourth output, that occupy the regular band, and
  output the amplified frequency components and other frequency components, of the fourth output, that occupy the extended band, as a fifth output.

7. The system of claim 6, wherein an insertion loss of the pump coupler is less than a given threshold.

8. The system of claim 1, wherein an insertion loss of the first band coupler is less than a given threshold.

9. The system of claim 1, wherein the regular band is the C-band and the extended band is the L-band.

10. The system of claim 1, further comprising:
a third band coupler to:
  decouple a second extended band and a combination of the regular band and the extended band;
a third ROADM to:
  add or drop one or more frequencies in the decoupled second extended band to produce a fourth output in the second extended band; and
a fourth band coupler to:
  couple the fourth output and the third output to produce a fifth output occupying the regular band, the extended band, and the second extended band.

11. The system of claim 10, further comprising:
a Raman amplifier to amplify frequency components, of the fifth output, that occupy the second extended band.

12. The system of claim 11, wherein the system includes at least one of:
a multi-core optical fiber; or
an optical fiber with a core approximately 130 microns.

13. The system of claim 1, wherein optical signals in the third output is modulated in accordance with one of:
  the differential phase shift keying (DPSK) modulation scheme;
  the differential quadrature phase shift keying (DQPSK) modulation scheme; or
  the dual polarization quadrature phase shift keying (DP-QPSK) modulation scheme.

14. A system comprising:
a first band coupler to:
  receive a first optical signal, in a first communication band and a second communication band, on a first optical path,
  decompose the first optical signal into a second optical signal in the first communication band and a third optical signal in the second communication band,
  output the second optical signal on a second optical path, and
  output the third optical signal on a third optical path;
a first reconfigurable optical add-drop multiplexer (ROADM) to:
  receive the second optical signal on the second optical path,
  add or drop one or more frequencies in the second optical signal to produce a fourth optical signal in the first communication band, and
  output the fourth optical signal on a fourth optical path;
a second ROADM to:
  receive the third optical signal, on the third optical path,
  add or drop one or more frequencies in the third optical signal to produce a fifth optical signal in the second communication band, and
  output the fifth optical signal on a fifth optical path; and
a second band coupler to:
  receive the fourth optical signal on the fourth optical path,
  receive the fifth optical signal on the fifth optical path,
  couple the fourth optical signal with the fifth optical signal, without optically amplifying or pumping the fourth optical signal or the fifth optical signal, to produce a sixth optical signal in the first and second communication bands, and
  output the sixth optical signal on a sixth optical path.

15. The system of claim 14, further comprising:
an optical amplifier to:
  receive the sixth optical signal and amplify frequency components, of the sixth optical signal, that occupy the first communication band, and
  output the amplified frequency components and other frequency components, of the sixth optical signal, that occupy the second communication band, as a seventh optical signal.

16. The system of claim 15, further comprising:

a Raman pump;

a pump coupler for coupling signals from the Raman pump to the seventh optical signal to produce an eighth optical signal.

17. The system of claim 14, further comprising:

a Raman pump, and a pump coupler for coupling optical signals from the Raman pump to the sixth optical signal to produce a seventh optical signal.

18. The system of claim 17, further comprising:

an optical amplifier to:

receive the seventh optical signal and amplify frequency components, of the seventh optical signal, that occupy the first communication band, and output the amplified frequency components and other frequency components, of the seventh optical signal, that occupy the second communication band, as an eighth optical signal.

19. The system of claim 17, wherein an insertion loss of the pump coupler is less than a given threshold.

20. The system of claim 14, wherein an insertion loss of the first band coupler is less than a given threshold.

21. The system of claim 14, wherein the first communication band is the C-band and the second communication band is the L-band.

22. A method comprising:

selecting a route of an optical network;

rerouting network traffic to traverse around the route and on alternate routes;

disconnecting fiber links to reconfigurable optical add-drop multiplexers (ROADMS) and optical amplifiers from the route, wherein the ROADMS include a first ROADM;

installing band couplers and pump couplers in the route, wherein the band couplers include a first band coupler and a second band coupler;

reconnecting the ROADMS and the optical amplifiers to the route;

allowing the network traffic to traverse the route;

installing Raman pumps and new ROADMS in the route, wherein the new ROADMS include a second ROADM, wherein:

the first band coupler is configured to decouple a regular band and an extended band, the first ROADM is configured to add or drop one or more frequencies in the decoupled regular band to produce a first output in the regular band, the second ROADM is configured to add or drop one or more frequencies in the decoupled extended band to produce a second output in the extended band; and the second band coupler is configured to couple the first output and the second output to produce a third output occupying the regular band and the extended band.

23. The method of claim 22, further comprising:

adding new channels in the extended band.

* * * * *